(12) United States Patent
Rehn

(10) Patent No.: US 9,366,413 B2
(45) Date of Patent: Jun. 14, 2016

(54) LIGHTING DEVICE WITH PUMP LIGHT SOURCE AND PHOSPHOR ARRANGEMENT

(71) Applicant: OSRAM GmbH, Munich (DE)

(72) Inventor: Henning Rehn, Berlin (DE)

(73) Assignee: OSRAM GmbH, Munich (DE)

(*) Notice: Subject to any disclaimer, the term of this patent is extended or adjusted under 35 U.S.C. 154(b) by 79 days.

(21) Appl. No.: 14/054,849

(22) Filed: Oct. 16, 2013

(65) Prior Publication Data

US 2014/0111967 A1    Apr. 24, 2014

(30) Foreign Application Priority Data

Oct. 24, 2012  (DE) .................... 10 2012 219 387

(51) Int. Cl.

| F21V 9/10 | (2006.01) |
|---|---|
| F21V 13/08 | (2006.01) |
| F21V 13/14 | (2006.01) |
| F21V 14/04 | (2006.01) |
| G02B 27/10 | (2006.01) |
| G02B 27/14 | (2006.01) |
| G03B 21/20 | (2006.01) |
| G03B 33/12 | (2006.01) |

(52) U.S. Cl.
CPC . *F21V 9/10* (2013.01); *F21V 13/08* (2013.01); *F21V 13/14* (2013.01); *F21V 14/04* (2013.01); *G02B 27/1006* (2013.01); *G02B 27/141* (2013.01); *G03B 21/204* (2013.01); *G03B 33/12* (2013.01)

(58) Field of Classification Search
CPC ..................................... F21V 1/10; F21V 1/12
See application file for complete search history.

(56) References Cited

U.S. PATENT DOCUMENTS

| 4,461,573 A | 7/1984 | Lucht et al. |
| 2011/0122627 A1 | 5/2011 | Hilmet et al. |
| 2012/0300178 A1* | 11/2012 | Sugiyama ............ H04N 9/3111 353/31 |
| 2013/0058114 A1 | 3/2013 | Reiners |

FOREIGN PATENT DOCUMENTS

| DE | 102010028949 A1 | 11/2011 |
| WO | 2012004713 A1 | 1/2012 |

* cited by examiner

*Primary Examiner* — Anne Hines
(74) *Attorney, Agent, or Firm* — Viering, Jentschura & Partner mbB

(57) ABSTRACT

In various embodiments, a lighting device is provided. The lighting device may include: a pump light source; a phosphor arrangement; and a light control element arranged between the pump light source and the phosphor arrangement; wherein the light control element is configured to split the pump light beam into a reflected part and a transmitted part and for controlling the ratio between reflected part and transmitted part; and wherein the phosphor arrangement includes at least one phosphor which can be irradiated with the reflected part and/or transmitted part of the pump light of the pump light source and emits said pump light again at least partly in a wavelength-converted fashion.

14 Claims, 6 Drawing Sheets

LIGHTING DEVICE WITH PUMP LIGHT SOURCE AND PHOSPHOR ARRANGEMENT

CROSS-REFERENCE TO RELATED APPLICATION

This application claims priority to German Patent Application Serial No. 10 2012 219 387.1, which was filed Oct. 24, 2012, and is incorporated herein by reference in its entirety.

TECHNICAL FIELD

Various embodiments relate to a lighting device including a pump light source and a phosphor arrangement for converting at least one part of the pump light into conversion light. Various embodiments are applicable, for example, to luminaires with color control, for example for lighting effects in the entertainment industry, that is to say inter alia for stages and film studios, but also in reception lobbies, sales areas, etc.

BACKGROUND

Light sources having high luminous flux and high luminance are employed in a wide variety of fields, for instance for luminaires in the entertainment industry, gas discharge lamps currently being the most widely used for this purpose.

In lighting applications based on fundamentally known LARP ("Laser Activated Remote Phosphor") technology, a phosphor is excited by a laser arranged at a distance therefrom. In this case, the laser radiation impinging on the phosphor is converted by the phosphor by mean of wavelength conversion at least partly into wavelength-converted useful light.

The light wavelength-converted by the phosphors (conversion light) is usually collected by means of an optical device, e.g. reflector, converging lens or TIR optical unit (TIR: Total Internal Reflection; i.e. conical glass rod), and used further for the relevant application.

Particularly in lighting applications in the entertainment sector there is a need to be able to set or change the light color, for example in order to obtain colored lighting effects.

SUMMARY

In various embodiments, a lighting device is provided. The lighting device may include: a pump light source; a phosphor arrangement; and a light control element arranged between the pump light source and the phosphor arrangement; wherein the light control element is configured to split the pump light beam into a reflected part and a transmitted part and for controlling the ratio between reflected part and transmitted part; and wherein the phosphor arrangement includes at least one phosphor which can be irradiated with the reflected part and/or transmitted part of the pump light of the pump light source and emits said pump light again at least partly in a wavelength-converted fashion.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which:

FIG. 1b shows the schematic beam path of the pump light reflected or transmitted by the light control elements in the embodiment in accordance with FIG. 1a;

FIG. 5 shows a phosphor arrangement in accordance with FIG. 1a;

DESCRIPTION

Figure 1A:
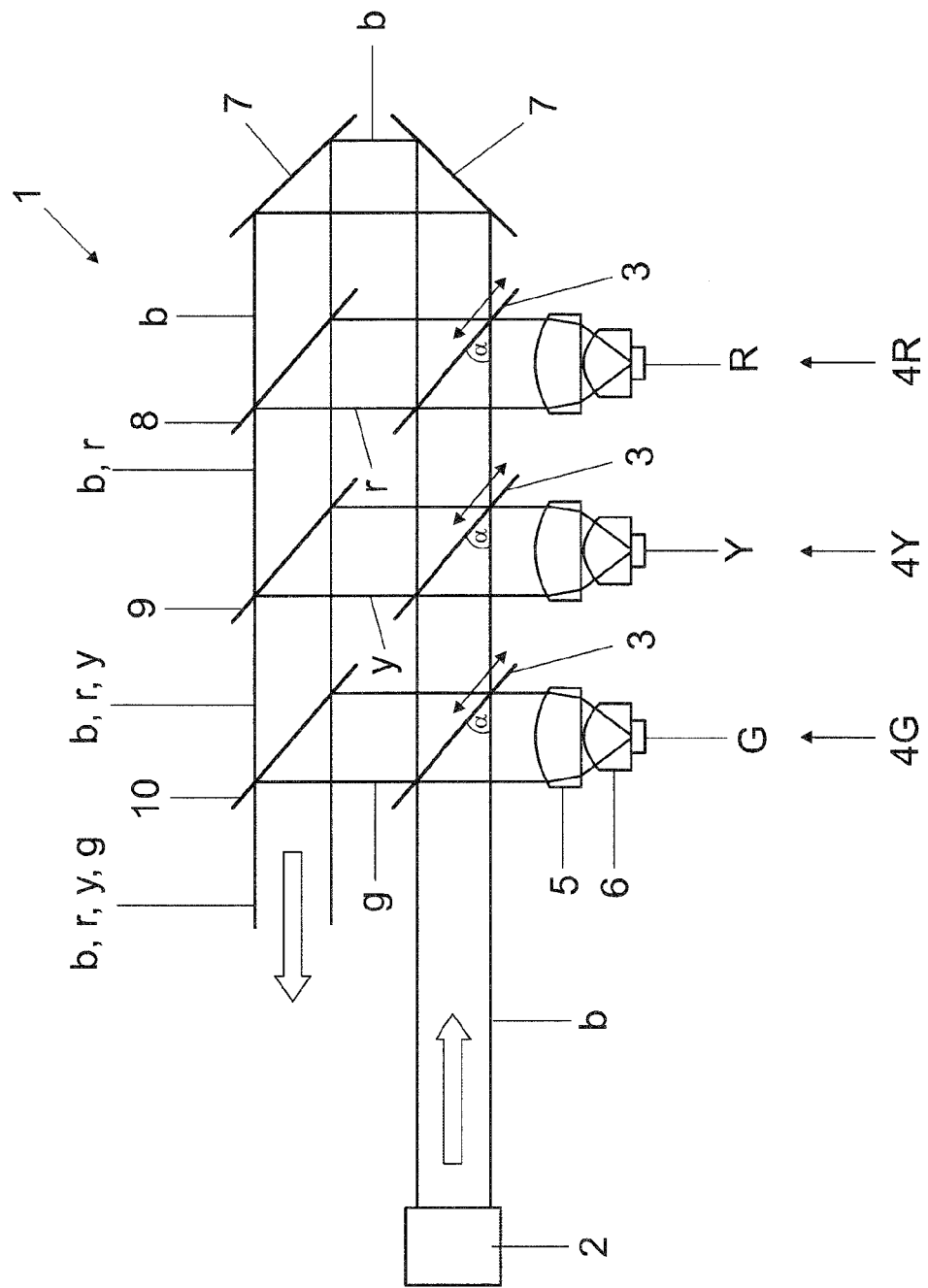
FIG. 1a shows in schematic illustration a first embodiment of a lighting device according to various embodiments including light control elements.

The following detailed description refers to the accompanying drawings that show, by way of illustration, specific details and embodiments in which the invention may be practiced.

The word "exemplary" is used herein to mean "serving as an example, instance, or illustration". Any embodiment or design described herein as "exemplary" is not necessarily to be construed as preferred or advantageous over other embodiments or designs.

The word "over" used with regards to a deposited material formed "over" a side or surface, may be used herein to mean that the deposited material may be formed "directly on", e.g. in direct contact with, the implied side or surface. The word "over" used with regards to a deposited material formed "over" a side or surface, may be used herein to mean that the deposited material may be formed "indirectly on" the implied side or surface with one or more additional layers being arranged between the implied side or surface and the deposited material.

Various embodiments provide a lighting device of the generic type having an adjustable light color.

Various embodiments provide a lighting device, including a pump light source source, a phosphor arrangement and a light control element arranged between the pump light source and the phosphor arrangement, wherein the light control element is suitable for splitting the pump light beam into a reflected part and a transmitted part and for controlling the ratio between reflected part and transmitted part, the phosphor arrangement includes at least one phosphor which can be irradiated with the reflected part and/or transmitted part of the pump light of the pump light source and emits said pump light again at least partly in a wavelength-converted fashion.

Moreover, various aspects for operating the lighting device according to various embodiments are provided by a method having the features of the independent method claim.

The features described below for the lighting device according to various embodiments and the possibilities for configuration thereof and the advantages of said features also analogously hold true, insofar as applicable, for the method according to various embodiments, and vice versa.

A concept of various embodiments may be seen in controlling that portion of the pump light which is branched off for phosphor conversion with the aid of a light control element. It may thereby be possible to control the hue of the mixed light obtained by combining the wavelength-converted light and the remaining pump light, the latter if appropriate after further phosphor conversion.

For this purpose, the light control element may be designed to split the pump light beam into a reflected part and a transmitted part and to control the ratio between reflected part and transmitted part. The ratio may generally be arbitrarily adjustable and is intended in particular also to encompass the limit values 100% reflected proportion and 0% transmitted portion (all pump light is reflected by the light control element, i.e. no pump light is transmitted by the light control element), or vice versa.

In other words, in principle the color locus of the light emitted by the lighting device according to various embodiments may be controlled in such a way that colored light (light having a light color such as, for example, blue, green, yellow, red), or else white light having different CCT (Correlated Color Temperature) or color coordinates of a chromaticity diagram (for example CIE standard diagram) can result. The phosphors used and the spectrum of the pump light span a color space within which the color locus of the resulting light can be controlled.

In connection with various embodiments, the term "control" is intended to encompass both a single or sporadic setting of the ratio and a periodic or continuous change, for example on the basis of a suitable control program or a regulating signal from a light color detector. In various embodiments, the regulating unit may sequentially and/or synchronously bring about positions of the light control elements defined on the basis of a regulating program installed in terms of software or hardware, such that specific color temperatures or coordination in the CIE chromaticity diagram can be set in a targeted manner. The light control elements may also be operated in a modulated manner, such that they change periodically back and forth for example between two or more positions. The exact positional setting of the light control elements can be made more precise or corrected by means of feedback via optical sensors, for example light sensors introduced in the beam path of the conversion light.

For splitting the pump light beam, the light control element may include a region which is designed to be reflective for the pump light. By way of example, the light control element may have a front side and a rear side, wherein the front side is provided with a region that reflects the pump light. Moreover, said region may be designed to be transparent to the wavelength-converted light. In this case, therefore, the region is designed as a dichroic mirror.

The light control element may be arranged in the pump light beam in such a way that the region of the front side reflects only a part of the impinging pump light onto the phosphor of the phosphor arrangement assigned thereto. In this case, only a part of the pump light beam impinges on the reflective region.

Moreover, the front side of the light control element may include a second region, which is designed to be transparent to the pump light and the wavelength-converted light. In this case, the light control element can be arranged in such a way that one part of the pump light beam is incident on the first (reflective) region and the other part on the second (transmissive) region.

For controlling the size of the irradiated area of the light control element and/or the ratio of the irradiated areas of both regions, the light control element may be designed to be movable, in particular for a translational or rotary movement.

The rear side of the light control element may include a region which is designed to be reflective for the wavelength-converted light. The rear side of the light control element may also include a region which is designed to be reflective for the pump light. The two regions may also be identical.

In the simplest case, the lighting device according to various embodiments has substantially only one light control element and an assigned phosphor arrangement. In this case, a part of the pump light serves for generating a first colored light, for example yellow light. For this purpose, the light control element is arranged in such a way that it only partly projects into the pump light beam. As a result, a first part of the pump beam is directed by the reflective region of the front side of the light control element onto the phosphor of the suitably arranged phosphor arrangement and is converted to form the first colored light portion. The remaining part of the pump light can pass through the light control element without being impeded (i.e. is transmitted by the light control element) and is used as second colored light. For this purpose, the pump light is chosen in a suitable visible part of the electromagnetic spectrum. Blue light, for example, is suitable.

The wavelength-converted colored light (first colored light) may be combined with the remaining pump light (second colored light) for further use to form the resulting mixed light. For this purpose, use can be made of a suitable optical element, for example a prism, which guides the remaining (transmitted) pump light back to the rear side of the light control element. The rear side of the light control element is designed to be reflective for the pump light, but transmissive (transparent) to the converted colored light. In this way, the converted colored light is combined with the pump light by the light control element. Depending on the position of the light control element in the pump light beam, the relative proportions of converted colored light and the pump light and thus the hue of the resulting mixed light can be controlled. For further details in this respect, reference is made to the embodiments.

Furthermore, the lighting device according to various embodiments may also include two or more phosphor arrangements. By way of example, two phosphor arrangements may be assigned to a light control element. For this purpose, the front side of the light control element has a first region, which is designed to be reflective for the pump light and transmissive to the first colored light wavelength-converted by the first phosphor arrangement. Moreover, the front side of the light control element has a second region, which is designed to be transparent to the pump light (and the first colored light). As a result, the transmitted part of the pump light passes to the suitably arranged second phosphor arrangement. By displacing the position of the light control element, it is possible to control the respective proportion of the pump light which impinges on the first or second phosphor arrangement and, consequently, the respective proportion of the two colored light components. The rear side of the light control element has a region which is designed to be reflective for the second colored light wavelength-converted by the second phosphor arrangement. In this way, the two colored light portions are combined by the common light control element.

Furthermore, a further light control element may be arranged between the pump light source and the first light control element in order to make possible a part of the pump light for combination with the two wavelength-converted colored light portions. For this purpose, the front side of the further light control element has a region that reflects pump light and a transparent region. Only the transmitted pump light portion that passes through the transparent region impinges on the first light control element and is split by the latter between the two phosphor arrangements. The pump light portion reflected by the further light control element can be combined, for example by means of a deflection mirror and a dichroic mirror arranged in the converted beam path, with the converted colored light portions to form the resulting mixed light.

Finally, the lighting device according to various embodiments may also include two or more light control elements arranged one behind another in the pump light beam. In this case, a phosphor arrangement is assigned to each light control element. Each of the light control elements is designed in this case in such a way that its front side has a first region, which reflects pump light, and a transparent second region. Moreover, the first region is designed to be transmissive to the respective wavelength-converted colored light, that is to say corresponds to a dichroic mirror element (only pump light is reflected, whereas different-colored converted light is transmitted). By means of the respective sizes of the areas of the two regions of the respective light control element which are irradiated by the pump light, it is possible to control the contribution of the associated wavelength-converted colored light portion in the resulting mixed light.

In various embodiments, the phosphor arrangements in each case include an optical unit disposed upstream of the phosphor for imaging the pump light onto the phosphor and collecting the light wavelength-converted by the phosphor.

The method according to various embodiments may control a ratio of that part of the pump light which is reflected onto the phosphor by the light control element to the transmitted part of the pump light.

The control of the ratio of the two light portions can be effected by movement of the reflective region of the light control element into the pump light beam, for example by pushing and/or rotation and/or tilting. The proportion of the pump light beam that irradiates the first (reflective) region and/or the proportion of the pump light beam that irradiates the second (transmissive) region of the front side of the light control element is thus controlled. The transmitted pump light can be at least partly directed onto a further phosphor and/or be combined with the wavelength-converted light.

In the context of the invention the term pump light or pump light source should be understood in a generalized way to the effect that it encompasses not only electromagnetic radiation visible to the human eye, but furthermore in particular ultraviolet (UV) and infrared (IR) radiation.

Lasers may be used in various embodiments as pump light source on account of the high power densities possible with said lasers. One suitable laser device may include e.g. at least one semiconductor laser, e.g. diode laser or laser diode. Moreover, it is possible to operate a plurality of laser diodes of identical type and/or different laser diodes in groups together, e.g. as a stack (laser stack) or matrix.

However, the embodiments are not restricted to the use of a laser as pump light source. By way of example, superluminescence diodes or high power light emitting diodes (high power LED), if appropriate with optical elements for shaping the LED light beams, and discharge lamps, if appropriate with a suitable attachment filter, may also be suitable.

The lighting device according to various embodiments provides light having a high luminance and adjustable light color. In this case, the resulting light color does not arise only by means of temporal averaging of temporally sequentially generated colored light components. Rather, the different colored light components or colored light combinations such as, for example, yellow-blue, red-green-blue, red-green-yellow-blue, red-green-green-blue, are if appropriate all generated simultaneously. In this case, it is possible to implement the luminance obtainable with the aid of LARP technology for the controllable colored light since the etendue is not increased.

FIG. 1a shows in schematic illustration a first embodiment of a lighting device 1. A laser device 2, for example a laser diode matrix consisting of 4×5 laser diodes each having a laser beam power of 1 watt, emits pump light in the form of blue laser radiation b having an emission wavelength of e.g. approximately 460 mm. The laser device 4 further also has optical elements for shaping in particular for collimating the laser radiation emitted by the laser diodes (for the sake of better clarity, the individual laser diodes and optical elements for laser beam shaping are not illustrated).

The collimated laser radiation b successively impinges on three light control elements 3 arranged in a manner spaced apart from one another and in each case at an angle α of approximately 45° relative to the incident laser beam b. For the following explanations in this respect, reference is also made to FIG. 1b, which shows in a schematic excerpt illustration the partial beams controlled by the three light control elements 3. The details shown there are not illustrated in FIG. 1a, for reasons of better clarity. The beam path is shown only roughly in a simplified manner in FIG. 1a. Moreover, for the following explanations, reference is also made to FIG. 2, which shows one of the three light control elements 10 in schematic illustration. The light control element 3 consists of a thin rectangular carrier material. The rectangular base area is divided into two regions $3_T$ and $3_R$. The first region $3_T$ is designed to be transparent to light, including the blue laser radiation. The second region $3_R$ is designed to be reflective for the blue laser radiation and transparent to light outside the blue spectral range. The second region $3_R$ therefore acts as a dichroic mirror for the blue laser radiation.

The light control elements 3 are designed for a translational movement in the plane of the two regions $3_T$ and $3_R$. The movement device respectively required for this purpose is not illustrated, for the sake of better clarity, but rather merely symbolized by a double-headed arrow. By means of the movement of a light control element 3, the proportion of the blue laser radiation $b_R$, $b_T$ respectively reflected or transmitted by said light control element can be controlled.

Figure 1B:
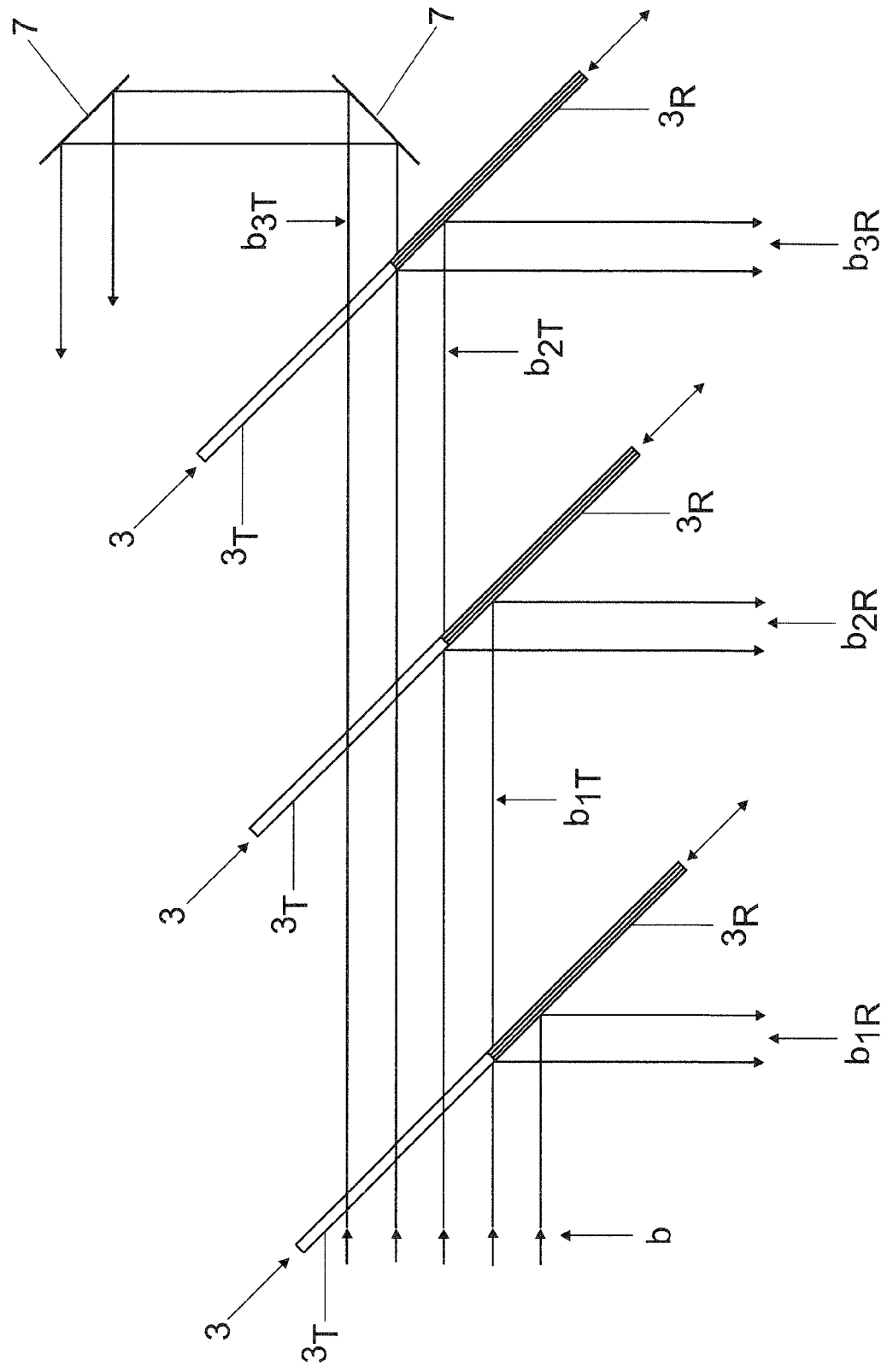
Figure 2:
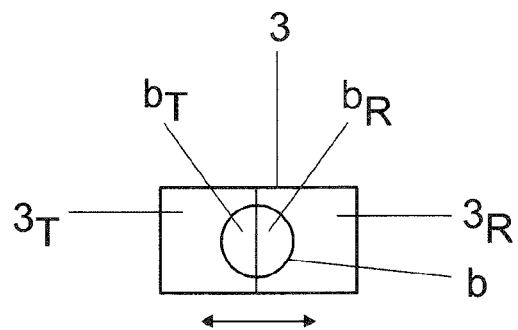
FIG. 2 shows a light control element in accordance with FIG. 1a and FIG. 1b.

FIG. 1b schematically illustrates an example of the color control according to various embodiments with the aid of the light control elements 3 in the lighting device 1 from FIG. 1a. For this purpose, the three light control elements 3 have been moved into different positions in each case in relation to the laser beam b incident from the left. The first light control element 3 (on the left in FIG. 1b) has been pushed at 45° into the laser beam b coming from the left in such a way that the predominant part $b_{1T}$ of the laser beam b is transmitted by the region $3_T$ and only a small part $b_{1R}$ is reflected by the region $3_R$.

The first transmitted part $b_{1T}$ of the laser beam b is in turn split into a second transmitted part $b_{2T}$ and a second reflected part $b_{2R}$ by the second light control element 3 (in the middle in FIG. 1b). For this purpose, the second light control element 3 is pushed somewhat further into the laser beam b by comparison with the first light control element 3 in such a way that a part of the first transmitted part $b_{1T}$ of the laser beam b is incident on the reflective region $3_R$ of the second light control element 3.

The second transmitted part $b_{2T}$ of the laser beam b is finally split into a third transmitted part $b_{3T}$ and a third reflected part $b_{3R}$ by the third light control element 3 (on the right in FIG. 1b). For this purpose, the third light control element 3 is pushed into the laser beam b somewhat further still in comparison with the second light control element 3.

The transmitted part $b_{3T}$ is not split further in this embodiment, but rather is used, as explained in greater detail further below, as blue light portion for the resulting useful light beam.

The transmissive region $3_T$ and the reflective region $3_R$ of the light control element 3 need not necessarily be arranged alongside one another. The above-described function can alternatively also be achieved by both regions being embodied as separate elements which are arranged one behind the other and are displaceable relative to one another. As long as only the transmissive element is situated in the laser beam, 100% transmission takes place. The more the reflective element is pushed in front of the transmissive element, the greater the reflected proportion becomes and the lower the transmitted proportion becomes.

Figure 6:
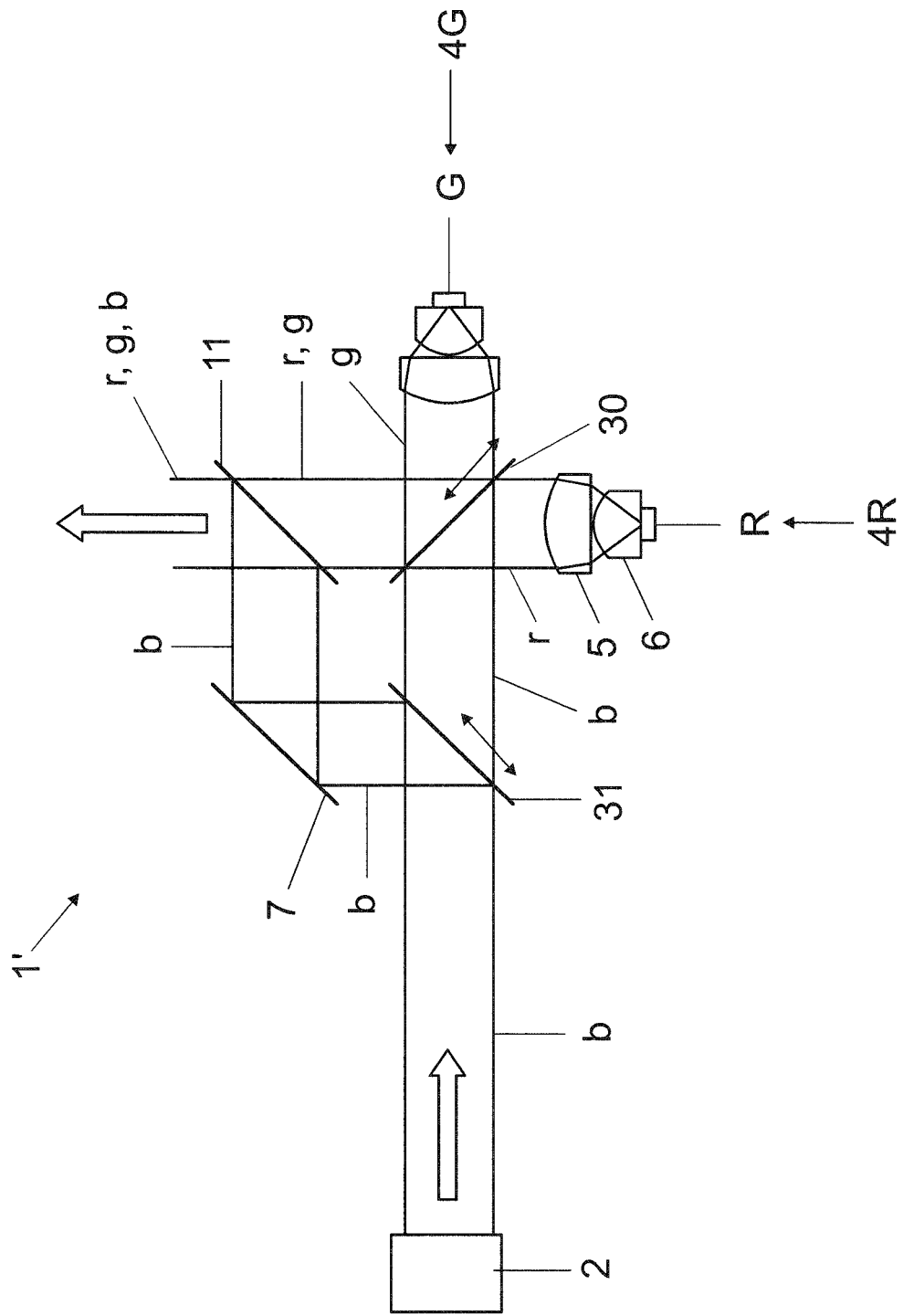
FIG. 6 shows in schematic illustration a second embodiment of a lighting device according to various embodiments.

Finally, the light control element can also consist only of a region which reflects the blue laser radiation, that is to say that the embodiment of a region which is transparent to the blue laser radiation can also be dispensed with, in principle. The light control element is then simply moved into the laser beam to different extents. However, the reflections that occur at the edge of the single region of the light control element may be disadvantageous in this case. Moreover, further light directing tasks can make such a second region for the light control element absolutely necessary, as in the case of the light control element 30 of the embodiment that is shown in FIG. 6 and explained further below.

Figure 3:
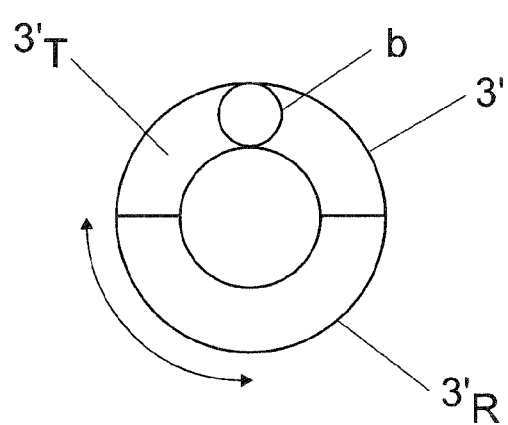
FIG. 3 shows a further embodiment of a light control element.
Figure 4:
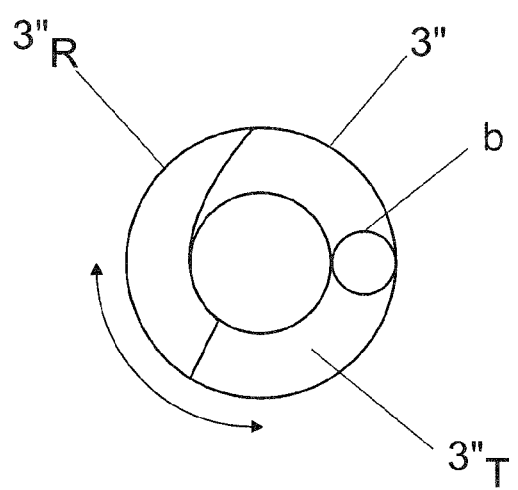
FIG. 4 shows a third embodiment of a light control element.

FIG. 3 and FIG. 4 show two alternative embodiments 3', 3" for the light control elements, which are both designed for a rotary movement. For this purpose, the two light control elements 3', 3" are in each case embodied as an annular disk. When the annular disk rotates, the blue laser beam spot b sweeps along the annular surface in accordance with the rotary movement.

The two light control elements 3' 3" designed for a rotary movement differ merely in the areal division of the transmissive and reflective regions. In the case of the embodiment 3', transparent region $3'_T$ and blue-reflecting region $3'_R$ are embodied as halves of an annulus. The transmission from one region to the other therefore takes place abruptly. In the case of the embodiment 3", by contrast, the transition from the transparent region $3''_T$ to the blue-reflecting region $3''_R$ is not abrupt, but rather continuously increasing up to the 100% blue-reflecting proportion. Furthermore, many further variants are also conceivable, depending on what dynamic colored lighting effects are intended. For further details with regard to the colored light control, reference is made to the corresponding explanations further below.

Figure 5:
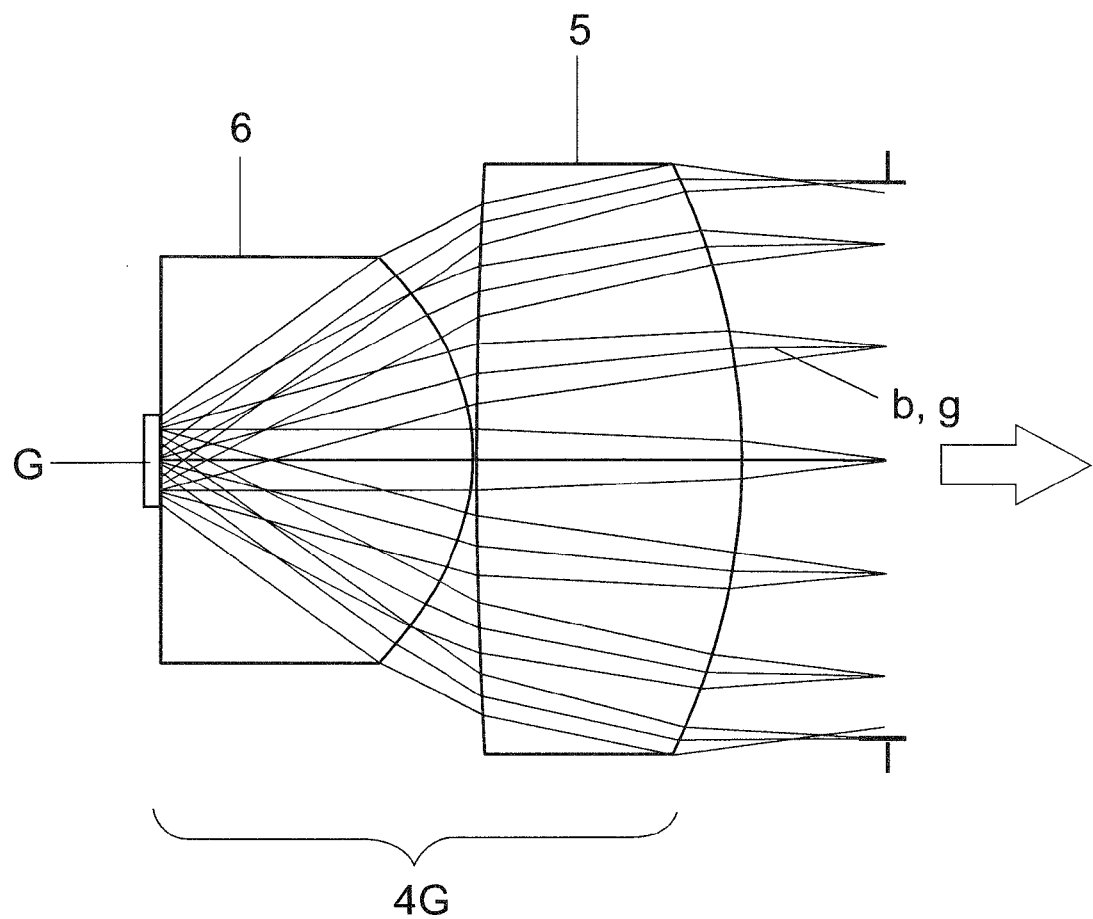

Each of the three light control elements 3 in FIG. 1a is in each case assigned a phosphor arrangement 4G, 4Y and 4R, respectively, that part of the laser radiation b which is reflected by the respective light control element 3 impinges on the associated phosphor arrangement. For the following description of such a phosphor arrangement, reference is also made to FIG. 5, which shows the phosphor arrangement 4G in an enlarged illustration.

The phosphor arrangement 4G consists of a phosphor lamina G and a double lens system 5, 6, which focuses that part of the blue laser radiation b which is reflected by the light control element 3 onto the phosphor lamina G and at the same time collects the light g wavelength-converted and backscattered by the phosphor lamina G. For this purpose, the phosphor lamina G is applied to a planar end face of the second focusing lens 6 (as viewed from the incident laser beam b). Alternatively, the phosphor can also be applied on a moved carrier, for example a phosphor wheel.

The phosphor arrangement 4G is therefore operated in reflection, wherein the wavelength-converted light g is directed for further use in the direction of the arrow to the associated light control element 3 and is transmitted by the latter. Furthermore, FIG. 5 reveals that, on account of the double lens system 5, 6, an irradiation of the entire area of the phosphor lamina G is obtained even with a partial laser beam bundle such as is reflected onto the phosphor arrangement 4G given a corresponding position of the light control element 3 (this is the reflected partial beam $b_{1R}$ for the phosphor arrangement 4G in FIG. 1a and FIG. 1b). The phosphor lamina G includes a green phosphor that converts the blue laser radiation b ("pump light") into green light g.

The other two phosphor arrangements 4Y and 4R differ from the phosphor arrangement 4G merely in that the phosphor lamina G including the green phosphor is replaced by a phosphor lamina Y including a yellow phosphor and a phosphor lamina R including a red phosphor, respectively. In the embodiment in accordance with FIG. 1a and FIG. 1b, the phosphor lamina Y is irradiated with the second reflected partial beam $b_{2R}$ and the phosphor lamina R is irradiated with the third reflected partial beam $b_{3R}$. In this way, therefore, the phosphor arrangement 4Y provides yellow light y, and the phosphor arrangement 4R provides red light r. As described above for the converted green light g, the yellow light y and the red light r are also transmitted by the assigned light control elements 3. By pushing the reflective region $3_R$ of a light control element 3 in and out, it is possible to control the contribution of the associated phosphor arrangement and, consequently, of the corresponding colored light proportion in the resulting useful light of the lighting device 1.

That portion ($b_{3T}$ in FIG. 1b) of the blue laser radiation b that has ultimately remained after passing through all three light control elements 3 is finally combined with the above-mentioned colored light components g, y and r and mixed for example in an optical integrator (the latter is not illustrated in FIG. 1a).

For this purpose, the blue laser radiation b is directed back via two 45° deflection mirrors 7 in the form of an optical loop. The three wavelength-converted colored light components g, y and r are reflected via corresponding dichroic mirrors 8, 9, 10 colinearly into the blue laser beam b directed back. For this purpose, the dichroic mirrors 10, 11, 12 are firstly arranged in their associated colored light beam g, y, and r, respectively. Secondly, they are displaced relative to the light control elements 3 in a parallel fashion until they are present at their colinear position in the laser beam b directed back. The three dichroic mirrors are transparent to the blue laser radiation and reflect the colored light beams g, y and r, respectively, in the order mentioned above.

With the aid of the three light control elements 3, the relative proportions of all four colored light components, namely b (blue), g (green), y (yellow) and r (red) can be varied virtually arbitrarily in order to obtain corresponding colored lighting effects. For this purpose, the position of one of the three light control elements, the positions of two or even all three light control elements is/are varied by displacement and thus so is the proportion of the blue laser radiation b reflected or transmitted by the respective light control element. A change in the proportion of reflected laser radiation in turn has a direct effect on the proportion of the colored light wavelength-converted by the assigned phosphor arrangement. In various embodiments, one or a plurality of the light control elements 3 can be set in such a way that they transmit the entire impinging blue laser radiation. In this case, the respectively assigned phosphor arrangement is not irradiated, that is to say that it does not contribute to the phosphor conversion or the relevant colored light component does not occur in the resulting light beam. By contrast, if the entire laser radiation incident on a light control element is reflected onto the assigned phosphor arrangement, all subsequent phosphor arrangements and ultimately the laser beam loop no longer contribute to the resulting light beam.

FIG. 6 shows in schematic illustration a second embodiment of a lighting device 1' according to various embodiments. The lighting device 1' includes a phosphor arrangement 4R for the wavelength conversion of the blue laser radiation b into red light r and a phosphor arrangement 4G for the wavelength conversion into green light g. The two phosphor arrangements are arranged at right angles with respect to one another, wherein a jointly used displaceable light control element 30 is arranged in the intersection region of both beam paths in a 45° position.

The front side of the light control element 30 facing the incident blue laser radiation b has, in a similar manner to the embodiment in FIG. 1, a transparent, first region and a blue-light-reflecting, second region (not discernible in FIG. 6). By means of the second region, one part of the blue laser radiation b is reflected onto the phosphor lamina R, while the other part is transmitted and impinges on the other phosphor arrangement 4G. The red light r converted by the red phosphor R can pass through the light control element 30. The rear side of the light control element 30 has a region that reflects green light. The green light g converted by the green phosphor G is therefore reflected by the light control element 30 colinearly with respect to the red light r. The relative proportions of red and green light r, g can be varied in a targeted manner by means of the position of the light control element 30.

Moreover, by means of an optical loop, a part of the blue laser radiation b is reflected colinearly into the red and green light beam paths r, g. For this purpose, a further displaceable light control element 31 is arranged between the laser device 2 and the first light control element 30 in a 45° position. The proportion of the blue laser radiation b for the optical loop is set with the aid of the light control element 31. A 45° deflection mirror 7 and a dichroic mirror 11 reflect the blue partial laser beam b colinearly into the red and green light beam paths r, g. For this purpose, the dichroic mirror 11 is designed to be reflective for the blue laser radiation b and transparent to the red and green light r, g and is arranged in a manner tilted by 45° in the red and green light beam paths r, g. A light beam having the colored light components r (red), g (green), b (blue), the relative proportions of which can be controlled by means of the light control elements 30, 31, results downstream of the dichroic mirror 11.

In a variant that is not illustrated, the red phosphor lamina R and the green phosphor lamina G are replaced by a yellow phosphor lamina Y and blue phosphor lamina B, respectively. With the aid of blue-violet or even ultraviolet laser radiation, yellow or blue conversion light is thus generated. The branching-off of laser radiation in a separate loop can thus be dispensed with and, consequently, it is also possible to dispense with the light control element 31, the deflection mirror 7 and the dichroic mirror 11.

Figure 7:
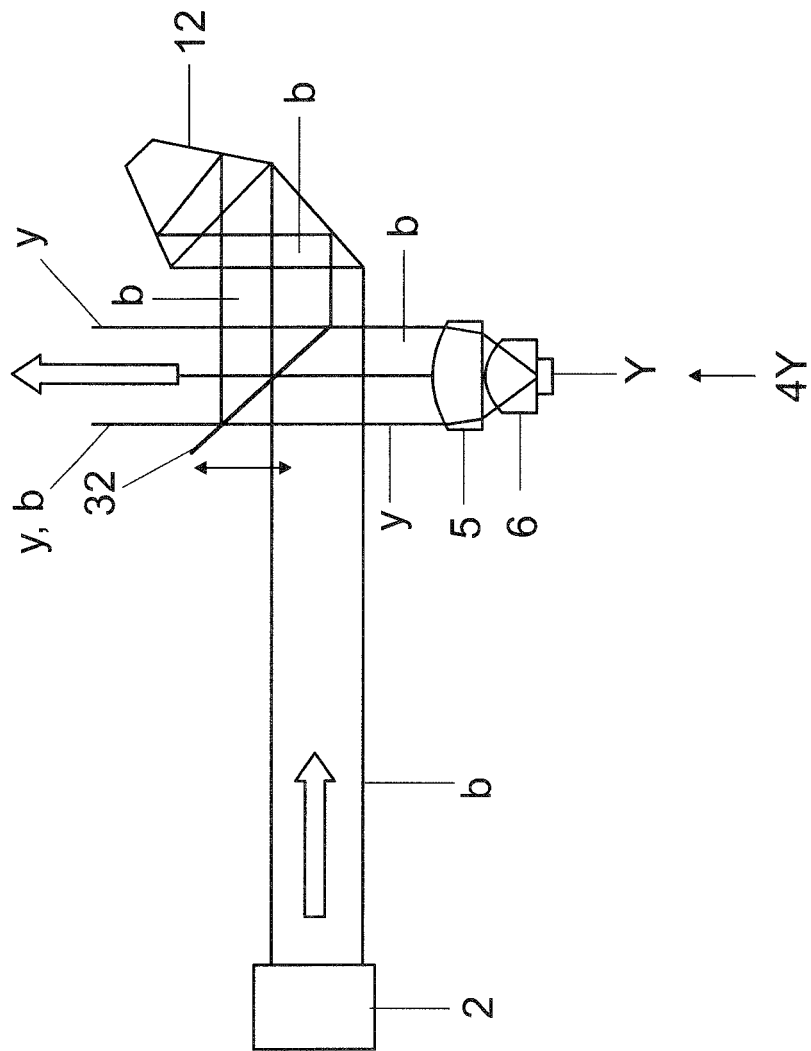
FIG. 7 shows in schematic illustration a third embodiment of a lighting device according to various embodiments.

FIG. 7 shows in schematic illustration a further embodiment of a lighting device 1". This is the simplest variant with only a single phosphor arrangement 4Y.

The phosphor arrangement 4Y has a yellow phosphor lamina Y, for the wavelength conversion of the blue laser radiation b into yellow light y. That part of the blue laser radiation b which is reflected onto the yellow phosphor lamina y is controlled by means of a light control element 32 arranged at 45° with respect to the incident laser radiation. For this purpose, the light control element 32 is designed as a dichroic mirror which reflects the blue laser radiation b coming from the laser arrangement 2 and transmits the wavelength-converted yellow light y. Moreover, the light control element 32 is positioned in such a way that it reflects only a part of the laser beam b in the direction of the phosphor arrangement 4Y. The rest of the laser beam b goes past the light control element 32 and enters into a TIR prism 12 (TIR=Total Internal Reflection). Alternatively, a corresponding prism reflectively coated at the outer surfaces can also be used, of course. By displacing the light control element 32 in the reflection direction, that is to say transversely with respect to the laser beam b, it is possible for this proportion to be varied.

The prism 12 is designed in such a way that a parallel beam offset counter to the direction of incidence is obtained by means of internal reflections. As a result, the laser beam b impinges back on the rear side of the light control element 32, from where it is reflected colinearly with respect to the transmitted yellow light y. For this purpose, the rear side of the light control element 32 is likewise designed to be reflective for the laser radiation b. Therefore, a light beam having the colored light components y (yellow) and b (blue), the relative proportions of which can be controlled by means of the light control element 32 (displaceable dichroic mirror), results downstream of the dichroic mirror 32. In various embodiments, the light control element 32 can also be set in such a way that no blue laser light b at all is transmitted by the light control element 32. In this case, the resulting light beam consists only of the converted yellow colored light y. On the other hand, the light control element 32 can also be set in such a way that it reflects no blue laser light b at all in the direction of the phosphor arrangement 4Y. In this case, the resulting light beam consists only of the unconverted blue laser light b. It goes without saying that all mixture ratios between these two limiting cases can also be set or constantly change automatically, for example with the aid of the annular light control elements 3' or 3" shown in FIG. 3 or FIG. 4.

Various embodiments propose a lighting device 1 in which the light color can be controlled with the aid of at least one light control element 3. The light control element 3 enables a pump light beam b to be split into a transmitted and a reflected portion. A portion of the pump light beam is fed to at least one phosphor arrangement (4G, 4Y, 4R) and converted there into colored light (g, y, r). By influencing the transmitted and/or reflected portion, for example by displacing the light control element 3 in the pump light beam b, it is possible to control the contribution of the colored light portions (g, y, r) in the resulting mixed light and, consequently, the light color thereof.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:
1. A lighting device, comprising:
  a pump light source;
  a phosphor arrangement; and
  a light control element arranged between the pump light source and the phosphor arrangement;
  wherein the light control element is configured to split the pump light beam into a reflected part and a transmitted part and for controlling the ratio between reflected part and transmitted part; and
  wherein the phosphor arrangement comprises at least one phosphor which can be irradiated with at least one of the reflected part and transmitted part of the pump light of the pump light source and emits said pump light again at least partly in a wavelength-converted fashion, wherein the light control element has a front side and a rear side; and wherein the front side comprises a region which is designed to be reflective for the pump light.

2. The lighting device of claim 1, wherein the light control element is arranged in such a way that the region of the front side reflects only a part of the impinging pump light onto the phosphor of the phosphor arrangement.

3. The lighting device of claim 1, wherein the region of the front side is designed to be transparent to the wavelength-converted light.

4. The lighting device of claim 1, wherein the front side of the light control element comprises a second region, which is designed to be transparent to the pump light and the wavelength-converted light.

5. The lighting device of claim 1, further comprising;

one or more further light control elements arranged one behind another in the pump light beam, wherein a phosphor arrangement is assigned to each light control element.

6. The lighting device of claim 1, wherein the rear side of the light control element comprises a region which is designed to be reflective for the wavelength-converted light.

7. The lighting device of claim 1, wherein the rear side of the light control element comprises a region which is designed to be reflective for the pump light.

8. The lighting device of claim 7, wherein a prism is disposed downstream of the light control element and guides that part of the pump light which is transmitted by the light control element back to the reflective region of the rear side of the light control element.

9. The lighting device of claim 1, wherein the phosphor arrangement comprises an optical unit for imaging the pump light onto the phosphor and collecting the wavelength-converted light.

10. The lighting device of claim 1, wherein, for controlling the ratio of reflected to transmitted proportion of the pump light, the light control element is designed to be movable.

11. The lighting device of claim 10, wherein the movability of the light control element is translational, rotary or tilting.

12. A method for operating a lighting device, the lighting device comprising:

a pump light source;

a phosphor arrangement; and a light control element arranged between the pump light source and the phosphor arrangement;

wherein the light control element is configured to split the pump light beam into a reflected part and a transmitted part and for controlling the ratio between reflected part and transmitted part; and wherein the phosphor arrangement comprises at least one phosphor which can be irradiated with the reflected part and/or transmitted part of the pump light of the pump light source and emits said pump light again at least partly in a wavelength-converted fashion;

the method comprising:

controlling a ratio of that part of the pump light which is reflected by the light control element to the transmitted part of the pump light.

13. The method of claim 12, wherein the ratio is controlled by movement of the reflective region of the front side of the light control element into the pump light beam and thus by selection of the size of the irradiated area of the reflective region of the front side of the light control element.

14. The method of claim 12, wherein the phosphor is irradiated with the reflected or transmitted part of the pump light.

* * * * *